US012590182B2

(12) United States Patent
Kojo et al.

(10) Patent No.: US 12,590,182 B2
(45) Date of Patent: Mar. 31, 2026

(54) POLYPHENYLENE ETHER MELT EXTRUSION FORMED BODY AND METHOD FOR PRODUCING POLYPHENYLENE ETHER MELT EXTRUSION FORMED BODY

(71) Applicant: TOYOBO CO., LTD., Osaka (JP)

(72) Inventors: Yusuke Kojo, Otsu (JP); Akifumi Yasui, Otsu (JP); Yasunori Fukushima, Otsu (JP); Teruyuki Taninaka, Otsu (JP); Kenta Hojo, Otsu (JP)

(73) Assignee: TOYOBO MC CORPORATION, Osaka (JP)

( * ) Notice: Subject to any disclaimer, the term of this patent is extended or adjusted under 35 U.S.C. 154(b) by 798 days.

(21) Appl. No.: 17/763,042

(22) PCT Filed: Sep. 18, 2020

(86) PCT No.: PCT/JP2020/035593
§ 371 (c)(1),
(2) Date: Mar. 23, 2022

(87) PCT Pub. No.: WO2021/060210
PCT Pub. Date: Apr. 1, 2021

(65) Prior Publication Data

US 2022/0380535 A1 Dec. 1, 2022

(30) Foreign Application Priority Data

Sep. 24, 2019 (JP) ................................ 2019-173425

(51) Int. Cl.

| | |
|---|---|
| ***C08G 65/40*** | (2006.01) |
| ***B29C 48/00*** | (2019.01) |
| ***B29C 48/05*** | (2019.01) |
| ***B29C 48/30*** | (2019.01) |
| ***B29C 48/375*** | (2019.01) |
| ***B29C 48/92*** | (2019.01) |
| *B29K 71/00* | (2006.01) |

(52) U.S. Cl.
CPC ...... *C08G 65/4081* (2013.01); *B29C 48/0022* (2019.02); *B29C 48/05* (2019.02); *B29C 48/301* (2019.02); *B29C 48/387* (2019.02); *B29C 48/92* (2019.02); *B29K 2071/12* (2013.01)

(58) Field of Classification Search
CPC ... C08G 65/4081; B29C 48/05; B29C 48/387; B29C 48/0022
See application file for complete search history.

(56) References Cited

U.S. PATENT DOCUMENTS

| | | | | |
|---|---|---|---|---|
| 8,722,839 | B2 | 5/2014 | Hossan | |
| 2013/0078465 | A1* | 3/2013 | Ting .......................... | D01F 8/12 264/176.1 |
| 2013/0324628 | A1* | 12/2013 | Hossan .................. | C08L 71/12 524/508 |
| 2019/0002637 | A1 | 1/2019 | Orimo et al. | |

FOREIGN PATENT DOCUMENTS

| | | | |
|---|---|---|---|
| JP | 2000-281893 | A | 10/2000 |
| JP | 2003-531234 | A | 10/2003 |
| JP | 2004-107511 | A | 4/2004 |
| JP | 2004-190156 | A | 7/2004 |
| JP | 2008-138294 | A | 6/2008 |
| JP | 4963909 | * | 6/2012 |
| JP | 2013-170258 | A | 9/2013 |
| JP | 2017-502179 | A | 1/2017 |
| JP | 2018-058983 | A | 4/2018 |
| WO | 0179351 | A1 | 10/2001 |
| WO | 2013/184161 | A1 | 12/2013 |
| WO | 2015/094451 | A1 | 6/2015 |
| WO | 2017/119017 | A1 | 7/2017 |
| WO | 2021/111706 | A1 | 6/2021 |

OTHER PUBLICATIONS

Orimo et al (JP 2018058983), English translation, published on Apr. 12, 2018.*
Ogawa et al (JP 2004190156), English translation, published on Jul. 8, 2004.*
Office Action dated Mar. 24, 2023, issued in counterpart JP Application No. 2021-548894. (4 pages).
Office Action dated Nov. 13, 2023, issued in counterpart CN Application No. 202080065443.2, with English translation. (15 pages).
Extended (Supplementary) European Search Report dated Apr. 24, 2024, issued in counterpart EP application No. 20867589.2. (11 pages).
Office Action dated Apr. 28, 2023, issued in counterpart CN Application No. 202080065443.2, with English translation. (18 pages).
Office Action dated Oct. 11, 2022, issued in counterpart JP Application No. 2021-548894, with English Translation. (8 pages).
International Search Report dated Dec. 1, 2020, issued in counterpart Application No. PCT/JP2020/035593. (3 pages).
Notification of Transmittal of Copies of Translation of the International Preliminary Report on Patentability (Form PCT/IB/338) issued in counterpart International application No. PCT/JP2020/035593 mailed Apr. 7, 2022 with Forms PCT/IB/373 and PCT/ISA/237. (8 pages).

(Continued)

*Primary Examiner* — Gregory Listvoyb
(74) *Attorney, Agent, or Firm* — WHDA, LLP

(57) ABSTRACT

An object of the present invention is to provide a polyphenylene ether melt extrusion formed body which can be obtained by melt forming without mixing other resin components and has excellent properties such as mechanical strength, and a method for producing the same. The present invention relates to a polyphenylene ether melt extrusion formed body comprising a polyphenylene ether component which has a rearrangement structure having a continuous structure bonded at an ortho-position in a repeating unit continuously bonded at a para-position.

13 Claims, 1 Drawing Sheet

(56) References Cited

OTHER PUBLICATIONS

Office Action dated Jul. 15, 2022, issued in counterpart JP Application No. 2021-548894, with English Translation. (14 pages).
Office Action dated Nov. 20, 2024, issued in counterpart JP Application No. 2023-147738, with English translation. (4 pages).
Office Action dated Jun. 27, 2025, issued in counterpart EP Application No. 20867589.2 (5 pages).

* cited by examiner

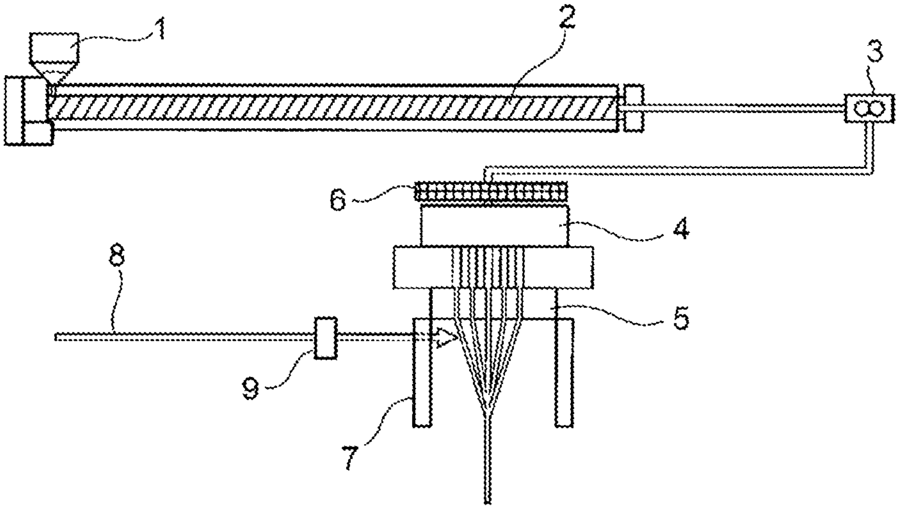
1
2
3
6
4
8
5
9
7

POLYPHENYLENE ETHER MELT EXTRUSION FORMED BODY AND METHOD FOR PRODUCING POLYPHENYLENE ETHER MELT EXTRUSION FORMED BODY

TECHNICAL FIELD

The present invention relates to a polyphenylene ether melt extrusion formed body containing a polyphenylene ether component having a rearrangement structure, and a method for producing the polyphenylene ether melt extrusion formed body.

BACKGROUND ART

Since polyphenylene ether (hereinafter, sometimes referred to as PPE) has excellent heat resistance, flame retardancy, strength, and chemical resistance and the like, a formed body formed of the polyphenylene ether is used in a wide range of fields. However, the polyphenylene ether generally has a high melt viscosity, which causes difficult melt forming when the polyphenylene ether is alone or contained in a high amount, and particularly causes difficult melt-spinning for obtaining a fiber.

As a melt-spun fiber containing polyphenylene ether, for example, there have been known a fiber obtained by melt-spinning a polymer alloy of an amorphous thermoplastic resin such as polyphenylene ether and a crystalline thermoplastic resin such as polypropylene (see, for example, Patent Document 1), a fiber containing polyphenylene ether, a processing aid containing linear low density polyethylene, a petroleum resin, or a combination thereof, and a flame retardant (see, for example, Patent Document 2), and a fiber formed of a polyphenylene ether-based resin composition containing polyphenylene ether and a copolymer having a functional group having reactivity with the polyphenylene ether (see, for example, Patent Document 3). A composition containing two kinds of polyphenylene ether resins having specific intrinsic viscosities has been known (see, for example, Patent Document 4).

PRIOR ART DOCUMENTS

Patent Documents

Patent Document 1: JP-A-2004-190156
Patent Document 2: JP-T-2017-502179
Patent Document 3: JP-A-2008-138294
Patent Document 4: JP-T-2003-531234

DISCLOSURE OF THE INVENTION

Problems to be Solved by the Invention

However, in Patent Documents 1 and 2, the crystalline thermoplastic resin such as polypropylene, and the processing aid and the like are added to the polyphenylene ether, to improve the processability of the polyphenylene ether. The content of the polyphenylene ether is low, whereby the excellent properties of the polyphenylene ether cannot be fully utilized. Furthermore, in Patent Document 3, the content rate of the polyphenylene ether is high, but only thick fibers having a diameter of 0.14 mm are obtained. This is considered to be unable to sufficiently improve the fluidity of the polyphenylene ether. In Patent Document 4, the polyphenylene ether formulation contains two kinds of polyphenylene ether resins having different intrinsic viscosities, whereby the polyphenylene ether formulation has high fluidity. That is, in these documents, the processability and fluidity of the polyphenylene ether are improved by adding any material to the polyphenylene ether or adjusting the intrinsic viscosity, and no study has been made on improvement in the processability provided by imparting a rearrangement structure to the polyphenylene ether.

An object of the present invention is to provide a polyphenylene ether melt extrusion formed body which can be obtained by melt forming without mixing other resin components and has excellent properties such as mechanical strength, and a method for producing the polyphenylene ether melt extrusion formed body.

Means for Solving the Problems

As a result of intensive studies on melt extrusion forming of polyphenylene ether, the present inventors have found that the above problems can be solved by using a polyphenylene ether component having a specific rearrangement structure, and have completed the present invention.

That is, the present invention relates to a polyphenylene ether melt extrusion formed body comprising a polyphenylene ether component which has a rearrangement structure having a continuous structure bonded at an ortho-position in a repeating unit continuously bonded at a para-position.

In the polyphenylene ether melt extrusion formed body of the present invention, the repeating unit continuously bonded at a para-position is preferably represented by the following general formula (1):

[Formula 1]

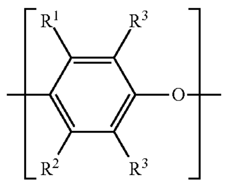

(1)

wherein: $R^1$ and $R^2$ are each independently a hydrogen atom or a hydrocarbon group having 1 to 10 carbon atoms which may have a substituent; and $R^3$ is each independently a hydrocarbon group having 1 to 10 carbon atoms which may have a substituent; and the rearrangement structure is preferably represented by the following general formula (2):

[Formula 2]

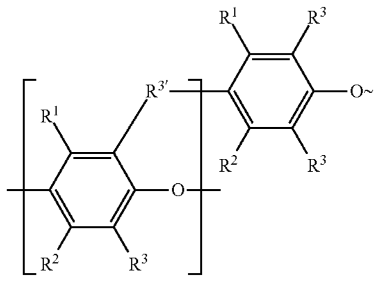

(2)

wherein: $R^1$ and $R^2$ are each independently a hydrogen atom or a hydrocarbon group having 1 to 10 carbon atoms which may have a substituent; $R^3$ is each independently a hydrocarbon group having 1 to 10 carbon atoms which may have a substituent; and $R^{3'}$ represents a divalent group in which one hydrogen atom is removed from $R^3$.

In the polyphenylene ether melt extrusion formed body of the present invention, an amount of rearrangement in the polyphenylene ether component having the rearrangement structure is preferably 0.01 mol % or more with respect to all polyphenylene ether structural units in the polyphenylene ether component.

In the polyphenylene ether melt extrusion formed body of the present invention, a content of the polyphenylene ether component is preferably 95% by mass or more in all components forming the formed body.

In the polyphenylene ether melt extrusion formed body of the present invention, the rearrangement structure preferably exhibits a peak in a range of 6.8 to 7.0 ppm and a peak in a range of 3.8 to 4.0 ppm in nuclear magnetic resonance spectrum ($^1$H-NMR) measurement.

In the polyphenylene ether melt extrusion formed body of the present invention, the polyphenylene ether melt extrusion formed body preferably has a glass transition temperature of 190° C. or higher and 210° C. or lower.

In the polyphenylene ether melt extrusion formed body of the present invention, the polyphenylene ether melt extrusion formed body is preferably a polyphenylene ether melt-spun fiber.

In the polyphenylene ether melt extrusion formed body of the present invention, the polyphenylene ether melt-spun fiber preferably has a single filament fineness of 1.0 dtex or more and 100 dtex or less.

In the polyphenylene ether melt extrusion formed body of the present invention, the polyphenylene ether melt-spun fiber is preferably a short fiber.

In the polyphenylene ether melt extrusion formed body of the present invention, the short fiber is preferably a flameproof short fiber.

In the polyphenylene ether melt extrusion formed body of the present invention, the polyphenylene ether melt extrusion formed body is preferably paper formed of the polyphenylene ether melt-spun fiber.

In the polyphenylene ether melt extrusion formed body of the present invention, the paper is preferably flameproof paper.

In the polyphenylene ether melt extrusion formed body of the present invention, the polyphenylene ether melt extrusion formed body is preferably a fabric formed of the polyphenylene ether melt-spun fiber.

In the polyphenylene ether melt extrusion formed body of the present invention, the fabric is preferably a flameproof fabric.

In the polyphenylene ether melt extrusion formed body of the present invention, the polyphenylene ether melt extrusion formed body is preferably a film.

In the polyphenylene ether melt extrusion formed body of the present invention, the film is preferably a flameproof film.

The present invention also relates to a method for producing a polyphenylene ether melt extrusion formed body, the method comprising the step of causing an extruder including a cylinder and a screw to melt extrude polyphenylene ether as a raw material at a peripheral speed of the screw of 3.6 m/min or more.

In the method for producing a polyphenylene ether melt extrusion formed body of the present invention, a temperature in the cylinder is preferably 250 to 350° C.

In the method for producing a polyphenylene ether melt extrusion formed body of the present invention, the polyphenylene ether as the raw material preferably contains polyphenylene ether having a glass transition temperature of 170° C. or higher.

In the method for producing a polyphenylene ether melt extrusion formed body of the present invention, the polyphenylene ether as the raw material may further contain polyphenylene ether having a glass transition temperature of lower than 170° C.

In the method for producing a polyphenylene ether melt extrusion formed body of the present invention, the polyphenylene ether melt extrusion formed body is a polyphenylene ether melt-spun fiber; and the method further preferably includes the step of discharging molten polyphenylene ether from a spinning nozzle to spin the polyphenylene ether after the melt extrusion step.

In the method for producing a polyphenylene ether melt extrusion formed body of the present invention, the spinning nozzle preferably has a single hole discharge amount of 0.4 g/min or less. The single hole discharge amount is preferably 0.2 g/min or less in order to obtain a fiber having a single filament fineness of 15 dtex or less.

Effect of the Invention

In the present invention, a polyphenylene ether component having a rearrangement structure is used, whereby a polyphenylene ether melt extrusion formed body which can be obtained by melt forming and has excellent mechanical strength and the like can be formed, and a melt-spun fiber which is more difficultly produced can also be formed. The polyphenylene ether melt extrusion formed body of the present invention has not only excellent mechanical strength but also excellent flame retardancy, heat resistance, and chemical resistance and the like. In the production method of the present invention, the molecular chain of raw material polyphenylene ether is cleaved by melt extrusion at a high screw rotation speed, to provide a rearrangement reaction, whereby the fluidity of the polyphenylene ether is greatly improved. This makes it possible to form the polyphenylene ether melt extrusion formed body. Furthermore, the melt formed body obtained by the production method of the present invention is formed of polyphenylene ether having a higher molecular weight than that of the raw material polyphenylene ether, whereby the melt formed body has a relatively high glass transition temperature. In the production method of the present invention, the rearrangement reaction of the polyphenylene ether is provided in a melt extrusion step, whereby the melt formed body can be obtained by melt forming.

BRIEF DESCRIPTION OF THE DRAWINGS

FIG. 1 is a cross-sectional view schematically showing one embodiment of a method for producing a polyphenylene ether melt extrusion formed body of the present invention.

MODE FOR CARRYING OUT THE INVENTION

Polyphenylene Ether Melt Extrusion Formed Body

A polyphenylene ether melt extrusion formed body of the present invention contains a polyphenylene ether component which has a rearrangement structure having a continuous structure bonded at an ortho-position in a repeating unit continuously bonded at a para-position. Here, the "rearrangement structure having a continuous structure bonded at an ortho-position" is a structure in which a continuous side chain bonded at an ortho-position is formed in a part of a repeating unit continuously bonded at a para-position of a main chain. The side chain may be formed of a repeating unit continuously bonded at a para-position, or may have a moiety partially bonded at an ortho-position therein.

The repeating unit continuously bonded at a para-position is preferably a repeating unit represented by the following general formula (1):

[Formula 3]

(1)

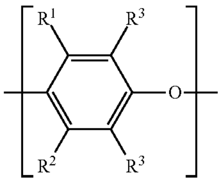

wherein: $R^1$ and $R^2$ are each independently a hydrogen atom or a hydrocarbon group having 1 to 10 carbon atoms which may have a substituent; and $R^3$ is each independently a hydrocarbon group having 1 to 10 carbon atoms which may have a substituent. The rearrangement structure preferably has a rearrangement structure represented by the following general formula (2):

[Formula 4]

(2)

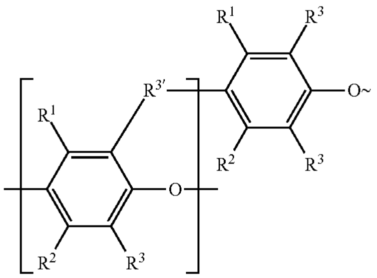

wherein: $R^1$ and $R^2$ are each independently a hydrogen atom or a hydrocarbon group having 1 to 10 carbon atoms which may have a substituent; $R^3$ is each independently a hydrocarbon group having 1 to 10 carbon atoms which may have a substituent; and $R^{3'}$ represents a divalent group in which one hydrogen atom is removed from $R^3$. In the general formula (2), "~" indicates that a structure after "~" is not particularly limited. The "~" moiety may be formed of a phenylene ether unit continuously bonded at a para-position, or may have a moiety partially bonded at an ortho-position therein.

The rearrangement reaction is, for example, a reaction represented by the following formula:

[Formula 5]

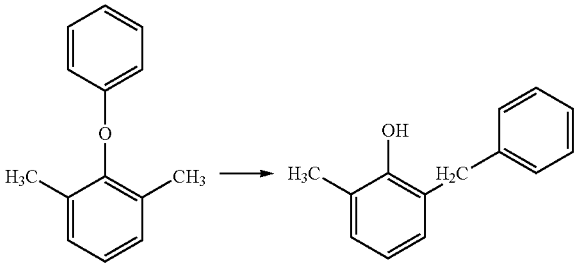

and is also referred to as methylene bridge rearrangement.

Generally, polyphenylene ether has a high melt viscosity, whereby the polyphenylene ether is considered to be difficultly melt formed when the polyphenylene ether is contained in a high content or when the polyphenylene ether is contained alone. In the present invention, the polyphenylene ether component having a rearrangement structure is contained, whereby the fluidity of the polyphenylene ether is improved to such an extent that the polyphenylene ether can be melt formed, which makes it possible to provide the melt extrusion formed body and also makes it possible to produce a melt-spun fiber which is more difficultly produced. Hereinafter, each component of the present invention will be described.

<Polyphenylene Ether Component>

The polyphenylene ether component used in the present invention contains polyphenylene ether having a rearrangement structure having a continuous structure bonded at an ortho-position in a repeating unit continuously bonded at a para-position.

The repeating unit continuously bonded at a para-position is preferably a repeating unit represented by the general formula (1), and the rearrangement structure preferably has a rearrangement structure represented by the general formula (2).

Examples of $R^1$ and $R^2$ in the general formulae (1) and (2) include a hydrogen atom, alkyl groups having 1 to 10 carbon atoms such as a methyl group, an ethyl group, a propyl group, an isopropyl group, an n-butyl group, an isobutyl group, a t-butyl group, a pentyl group, a cyclopentyl group, a hexyl group, a cyclohexyl group, an octyl group, and a decyl group, aryl groups having 6 to 10 carbon atoms such as a phenyl group, a 4-methylphenyl group, a 1-naphthyl group, and a 2-naphthyl group, and aralkyl groups having 7 to 10 carbon atoms such as a benzyl group, a 2-phenylethyl group, and a 1-phenylethyl group.

When the hydrocarbon group has a substituent, examples of the substituent include halogen atoms such as a fluorine atom, and alkoxy groups such as a methoxy group. Specific examples of the hydrocarbon group having a substituent include a trifluoromethyl group.

Among them, $R^1$ and $R^2$ are preferably a hydrogen atom or a methyl group, and more preferably a hydrogen atom.

Examples of $R^3$ in the general formulae (1) and (2) include alkyl groups having 1 to 10 carbon atoms such as a methyl group, an ethyl group, a propyl group, an isopropyl group, an n-butyl group, an isobutyl group, a t-butyl group, a pentyl group, a cyclopentyl group, a hexyl group, a cyclohexyl group, an octyl group, and a decyl group, aryl groups having 6 to 10 carbon atoms such as a phenyl group, a 4-methylphenyl group, a 1-naphthyl group, and a 2-naphthyl group, and aralkyl groups having 7 to 10 carbon atoms such as a benzyl group, a 2-phenylethyl group, and a 1-phenylethyl group.

When the hydrocarbon group has a substituent, examples of the substituent include halogen atoms such as a fluorine atom, and alkoxy groups such as a methoxy group. Specific examples of the hydrocarbon group having a substituent include a trifluoromethyl group.

Among them, $R^3$ is preferably a methyl group.

$R^{3'}$ represents a divalent group in which one hydrogen atom is removed from $R^3$, and is preferably a methylene group.

Specific examples of the repeating unit of the general formula (1) include repeating units derived from 2,6-dimethyl-1,4-phenylene ether, 2,6-diethyl-1,4-phenylene ether, 2-methyl-6-ethyl-1,4-phenylene ether, and 2,6-dipropyl-1,4-phenylene ether. Among them, a repeating unit derived from 2,6-dimethyl-1,4-phenylene ether is preferable.

The polyphenylene ether component having a rearrangement structure preferably has the rearrangement structure represented by the general formula (2) in a homopolymer having a repeating unit of the general formula (1) or a copolymer containing two or more different repeating units of the general formula (1).

The polyphenylene ether component having a rearrangement structure may contain a repeating unit other than the repeating unit of the general formula (1) as long as the effects of the present invention are not impaired. In this case, the polyphenylene ether component may have the rearrangement structure represented by the general formula (2) in a copolymer containing a repeating unit of the general formula (1) and a repeating unit other than the repeating unit of the general formula (1). The content of such a repeating unit other than the repeating unit of the general formula (1) is not particularly limited as long as the effects of the present invention are not impaired, but for example, the content of the repeating unit is preferably about 5 mol % or less in the copolymer, and it is more preferable that the repeating unit be not contained.

The molecular weight of the polyphenylene ether having a rearrangement structure is not particularly limited, but the weight average molecular weight (Mw) is preferably 40,000 to 100,000, and more preferably 50,000 to 80,000. The number average molecular weight (Mn) of the polyphenylene ether is preferably 7,000 to 30,000, and more preferably 8,000 to 20,000. The molecular weight dispersion (Mw/Mn) of the polyphenylene ether is preferably 3.5 to 8.0, and more preferably 4.0 to 6.0. The weight average molecular weight and the number average molecular weight can be measured by methods described in Examples.

The amount of rearrangement in the polyphenylene ether component having a rearrangement structure is not particularly limited, but is preferably 0.01 mol % or more, more preferably 0.05 mol % or more, still more preferably 0.1 mol % or more, and particularly preferably 0.15 mol % or more, with respect to all polyphenylene ether structural units in the polyphenylene ether component. Furthermore, in order to obtain a small fineness fiber having a single filament fineness of 15 dtex or less, the amount of rearrangement is preferably 2 mol % or more. The upper limit value of the amount of rearrangement is not particularly limited, but is preferably 20 mol % or less, more preferably 18 mol % or less, still more preferably 5 mol % or less, and still more preferably 4 mol % or less. The amount of rearrangement in the polyphenylene ether component having a rearrangement structure is within the above range, whereby the fluidity of the polyphenylene ether is improved to such an extent that the polyphenylene ether can be melt formed. This tends to make it possible to provide the melt extrusion formed body, which is preferable.

The rearrangement structure preferably exhibits a peak in a range of 3.8 to 4.0 ppm and a peak in a range of 6.8 to 7.0 ppm in nuclear magnetic resonance spectrum ($^1$H-NMR) measurement. Usually, the polyphenylene ether exhibits a peak at around 6.4 to 6.6 ppm, which is a peak derived from hydrogen atoms at the 3 and 5 positions of a benzene ring in the main chain of the polyphenylene ether. The polyphenylene ether having a rearrangement structure exhibits a peak in a range of 3.8 to 4.0 ppm and a peak in a range of 6.8 to 7.0 ppm in addition to the peak at around 6.4 to 6.6 ppm. The chemical shift of 3.8 to 4.0 ppm is derived from a proton of a divalent group represented by $R^{3'}$ (for example, a methylene group or the like) in the rearrangement structure. The chemical shift of 6.8 to 7.0 ppm is derived from protons of $R^1$ and $R^2$ groups at the 3 and 5 positions of the polyphenylene ether in the rearrangement structure (for example, hydrogen atoms at the 3-position and 5-position of a benzene ring bonded at an ortho-position via a methylene group).

The polyphenylene ether component used in the present invention may contain polyphenylene ether having no rearrangement structure. Examples of the polyphenylene ether having no rearrangement structure include a homopolymer having a repeating unit of the general formula (1), a copolymer containing two or more different repeating units of the general formula (1), and a copolymer containing a repeating unit of the general formula (1) and a repeating unit other than the repeating unit of the general formula (1). Examples of the content of the repeating unit other than the repeating unit of the general formula (1) in the copolymer include those described above.

The polyphenylene ether component used in the present invention may contain low molecular weight polyphenylene ether. Examples of the molecular weight of the low molecular weight polyphenylene ether include a weight average molecular weight of about 2,000 to 8,000.

The content of the polyphenylene ether component is preferably 95% by mass or more, more preferably 98% by mass or more, and still more preferably substantially composed only of the polyphenylene ether component (100% by mass), in all components forming the formed body. The content of the polyphenylene ether component in the polyphenylene ether melt extrusion formed body is within the above-mentioned range, whereby the obtained formed body has not only excellent mechanical strength but also excellent heat resistance, chemical resistance, and flame retardancy, and the like, which is preferable.

<Component Other than Polyphenylene Ether Component>

The polyphenylene ether melt extrusion formed body of the present invention may contain a resin component other than the polyphenylene ether component. Examples of the resin component other than the polyphenylene ether component include styrene, polyethylene, polypropylene, polyamides such as polyamide 4, polyamide 6, polyamide 10, polyamide 11, polyamide 66, polyamide 6T, and polyamide 6T/11, polyesters such as polyethylene terephthalate and polybutylene terephthalate, and polycarbonate. However, the content of the resin component is preferably 5% by mass or less, and more preferably 2% by mass or less. It is still more preferable that the resin component is not contained (0% by mass).

Additives such as a lubricant, a plasticizer, an antioxidant, an ultraviolet absorber, a texturing agent, and an antistatic agent can also be added to the polyphenylene ether melt extrusion formed body of the present invention as long as the effects of the present invention are not impaired.

<Polyphenylene Ether Melt Extrusion Formed Body>

The polyphenylene ether melt extrusion formed body of the present invention contains the polyphenylene ether component, and the method for producing the polyphenylene ether melt extrusion formed body is not particularly limited. However, for example, the polyphenylene ether melt extrusion formed body can also be produced by a method for producing a polyphenylene ether melt extrusion formed body as described later.

The glass transition temperature of the polyphenylene ether melt extrusion formed body is not particularly limited, but is preferably 190° C. or higher and 210° C. or lower, more preferably 190° C. or higher and 208° C. or lower, and still more preferably 200° C. or higher and 205° C. or lower. The glass transition temperature is within the above range, whereby both melt processability and heat resistance can be achieved in a well-balanced manner, which is preferable.

The maximum stress of the polyphenylene ether melt extrusion formed body is preferably 0.4 cN/dtex or more and 3.0 cN/dtex or less, and more preferably 0.8 cN/dtex or more and 2.0 cN/dtex or less. The maximum point elongation of the polyphenylene ether melt extrusion formed body is preferably 30% or more and 180% or less, and more preferably 60% or more and 150% or less. The maximum point stress and the maximum point elongation can be measured by methods described in Examples.

The shape of the melt extrusion formed body is not particularly limited, and the melt extrusion formed body can be formed into various shapes such as a pellet shape, a film shape, a sheet shape, a plate shape, a pipe shape, a tube shape, a rod shape, a fiber shape, a nonwoven fabric shape, a paper shape, and a fabric shape. The polyphenylene ether component used in the present invention has excellent forming processability, whereby a polyphenylene ether melt-spun fiber can be provided. The polyphenylene ether melt-spun fiber has excellent high-temperature stability. The polyphenylene ether melt-spun fiber may be a long fiber or a short fiber.

<Polyphenylene Ether Melt-Spun Fiber>

The single filament fineness of the polyphenylene ether melt-spun fiber is preferably 1.0 dtex or more and 100 dtex or less, more preferably 1.0 dtex or more and 50 dtex or less, and still more preferably 1.0 dtex or more and 15 dtex or less, for applications such as general heat-resistant filters and heat-resistant woven fabrics. Such a single filament fineness can be appropriately set depending on the use application thereof. In the present invention, the polyphenylene ether component having a specific rearrangement structure is contained, whereby the fluidity of the polyphenylene ether is improved, to allow melt-spinning, and a very thin fiber of 15 dtex or less can also be obtained.

2. Method for Producing Polyphenylene Ether Melt Extrusion Formed Body

A method for producing a polyphenylene ether melt extrusion formed body of the present invention includes the step of causing an extruder including a cylinder and a screw to melt extrude polyphenylene ether as a raw material at a peripheral speed of the screw of 3.6 m/min or more.

Examples of the polyphenylene ether as the raw material include a homopolymer having a repeating unit of the general formula (1), a copolymer containing two or more different repeating units of the general formula (1), and a copolymer having a repeating unit of the general formula (1) and a repeating unit other than the repeating unit of the general formula (1). Examples of the content of the repeating unit other than the repeating unit of the general formula (1) in the copolymer include those described above. Among them, a homopolymer having a repeating unit of the general formula (1) is preferable.

Specific examples of the homopolymer having a repeating unit of the general formula (1) include poly(2,6-dimethyl-1,4-phenylene ether), poly(2,6-diethyl-1,4-phenylene ether), poly(2-methyl-6-ethyl-1,4-phenylene ether), and poly(2,6-dipropyl-1,4-phenylene ether), and among them, poly(2,6-dimethyl-1,4-phenylene ether) is preferred.

As poly(2,6-dimethyl-1,4-phenylene ether), commercially available products can also be suitably used, and specific examples thereof include PPO 640, PPO 646, and PPOSA 120 manufactured by SABIC Innovative Plastics, and XYRON S201A and XYRON S202A manufactured by Asahi Kasei Chemicals Corporation.

The glass transition temperature of the polyphenylene ether as the raw material is preferably 170° C. or higher, more preferably 200° C. or higher, and still more preferably 210° C. or higher. The upper limit value of the glass transition temperature is not particularly limited, but is preferably 230° C. or lower. The glass transition temperature of the polyphenylene ether as the raw material is within the above range, whereby a polyphenylene ether formed body having high heat resistance can be obtained, which is preferable.

The raw material used in the present invention may contain two or more polyphenylene ethers having different glass transition temperatures. Specifically, the raw material may contain polyphenylene ether having a glass transition temperature of less than 170° C. in addition to the polyphenylene ether having a glass transition temperature of 170° C. or higher. The polyphenylene ether having a glass transition temperature of lower than 170° C. is added, whereby the melt viscosity of the raw material is decreased to improve the fluidity of the raw material, but the amount of rearrangement in the polyphenylene ether tends to be decreased.

The content of the polyphenylene ether having a glass transition temperature of 170° C. or higher in the polyphenylene ether as the raw material is preferably 80% by mass or more, more preferably 90% by mass or more, and still more preferably 95% by mass or more. The raw material is particularly preferably composed only of the polyphenylene ether having a glass transition temperature of 170° C. or higher. The upper limit value of the content of the polyphenylene ether having a glass transition temperature of 170° C. or higher is not particularly limited, but is preferably 100% by mass or less. In the present invention, polyphenylene ether having a high glass transition temperature (that is, a high molecular weight) is contained within the above range, whereby the obtained polyphenylene ether melt extrusion formed body has excellent mechanical strength, heat resistance, chemical resistance, and flame retardancy and the like, which is preferable.

In addition to the polyphenylene ether as the raw material, a resin component other than the polyphenylene ether component, and an additive can be contained. The resin component other than the polyphenylene ether component and the additive are as described above. The content of the resin component other than the polyphenylene ether component in the raw material is preferably 5% by mass or less, and more preferably 2% by mass or less. It is still more preferable that the resin component not be contained (0% by mass).

As the extruder including the cylinder and the screw, a single screw extruder or a twin screw extruder which can be usually used in the present field can be used. In the present invention, it is preferable to use a twin screw extruder. The extruder is not limited thereto, and any extruder may be used as long as the extruder can achieve the purpose of effectively subjecting a polymer to shear.

The peripheral speed of the screw is required to provide the rearrangement reaction of the polyphenylene ether as the raw material, and is 3.6 m/min or more, preferably 3.7 m/min or more, and more preferably 3.8 m/min or more. The upper limit value of the peripheral speed of the screw is not particularly limited, but is preferably 94.2 m/min or less. In the present invention, the rotation speed of the screw is increased to set the peripheral speed of the screw to 3.6 m/min or more, whereby a high shear force can be applied to the raw material polyphenylene ether in the cylinder, and as a result, the molecular chain of the polyphenylene ether can be cleaved to form polyphenylene ether having a rearrangement structure. The formation of the polyphenylene ether having a rearrangement structure allows the melt extrusion forming of the polyphenylene ether.

The shape of the screw is not particularly limited as long as a shearing force can be applied to such an extent that the rearrangement reaction of the polyphenylene ether as the raw material is provided.

When a temperature in the cylinder is too low, the fluidity of the resin is poor. When the temperature is too high, the fluidity is improved, but a foaming phenomenon occurs due to the thermal decomposition of the resin. This makes it necessary to select a processing temperature which provides a balance therebetween. The temperature in the cylinder is, for example, preferably 250 to 350° C., and more preferably 280 to 330° C. The temperature in the cylinder is preferably set within the above range, whereby a polymer chain is easily cleaved while the foaming phenomenon is suppressed, which is preferable.

When the polyphenylene ether melt extrusion formed body is composed of a polyphenylene ether melt-spun fiber, the method further includes the step of discharging molten polyphenylene ether from a spinning nozzle to spin the polyphenylene ether after the melt extrusion step.

An example of a case of producing a polyphenylene ether melt-spun fiber will be described with reference to FIG. 1. Polyphenylene ether as a raw material is charged into an extruder 2 including a cylinder and a screw from a hopper 1 in FIG. 1. The discharge speed of the molten polyphenylene ether is measured by a gear pump 3. The molten polyphenylene ether passes through a filter material 4 composed of fine sands and the like, and is discharged from a spinning nozzle 5, whereby a melt-spun fiber can be obtained. A filter 6 composed of a metal nonwoven fabric or the like is preferably set on the filter material 4. The filter 6 is set, whereby foreign substances can be removed in advance, and the clogging and the like of the filter material 4 can be prevented, which is preferable.

It is preferable to provide a heat-retaining space 7 immediately below the spinning nozzle 5, and introduce 8 an inert gas such as nitrogen into the region to perform spinning from the viewpoint of suppressing nozzle clogging due to oxidative crosslinking. It is more preferable to introduce an inert gas heated using a heating torch 9. The temperature of the heated inert gas is preferably 100 to 500° C., and more preferably 200 to 400° C.

A spinning speed is not particularly limited, and can be appropriately set depending on the required fineness and the like. However, the spinning speed is preferably about 100 to 400 m/min, and more preferably about 100 to 200 m/min in order to stably obtain a fiber having a small fineness.

The single hole discharge amount of the spinning nozzle is preferably 0.4 g/min or less, more preferably 0.3 g/min or less, and still more preferably 0.2 g/min or less. The lower limit of the single hole discharge amount is not particularly limited, but is preferably 0.05 g/min or more, more preferably 0.1 g/min or more, and still more preferably 0.12 g/min or more. The single hole discharge amount is within the above range, whereby a polyphenylene ether fiber having a small fineness can be obtained, which is preferable.

The single filament fineness of the polyphenylene ether melt-spun fiber obtained by the production method of the present invention can be appropriately set depending on the use application of the fiber, but according to the production method of the present invention, a thin fiber of 15 dtex or less can be obtained. In the present invention, by melting at a very high screw rotation speed, a high shear force is applied to the raw material polyphenylene ether. This provides a rearrangement reaction in the raw material polyphenylene ether to form polyphenylene ether having a rearrangement structure. As a result, the fluidity of the polyphenylene ether is improved to obtain the melt-spun fiber having the single filament fineness.

<Polyphenylene Ether Melt-Spun Short Fiber>

A polyphenylene ether melt-spun short fiber of the present invention can be obtained, for example, by cutting a tow fiber obtained by joining the polyphenylene ether melt-spun fibers.

The length of the polyphenylene ether melt-spun short fiber of the present invention is not particularly limited, and can be appropriately adjusted according to the application, but is usually 1 to 500 mm, preferably 3 to 400 mm, and more preferably 5 to 300 mm.

The tensile strength of the polyphenylene ether melt-spun short fiber of the present invention is not particularly limited, but is usually 0.8 to 60 cN/dtex, preferably 0.85 to 50 cN/dtex, and more preferably 0.9 to 40 cN/dtex. The tensile strength is measured in accordance with JIS L1013 8.5.1.

The tensile elongation of the polyphenylene ether melt-spun short fiber of the present invention is not particularly limited, but is usually 30 to 180%, preferably 40 to 160%, and more preferably 60 to 150%. The tensile elongation is measured in accordance with JIS L1013 8.5.1.

The equilibrium moisture content of the polyphenylene ether melt-spun short fiber of the present invention is not particularly limited, but is usually 0.01 to 1.5%, preferably 0.02 to 1.2%, and more preferably 0.03 to 1.0%. The equilibrium moisture content is measured in accordance with JIS L1013.

The high-temperature shrinkage ratio of the polyphenylene ether melt-spun short fiber of the present invention at 190° C. is not particularly limited, but is usually 0.1 to 6%, preferably 0.3 to 5%, and more preferably 0.5 to 4%. A method for measuring the high-temperature shrinkage ratio at 190° C. is as described in Examples.

The polyphenylene ether melt-spun short fiber of the present invention is preferably a flameproof short fiber.

The flameproof short fiber is obtained by subjecting the polyphenylene ether melt-spun short fiber to a flameproof treatment. The flameproof treatment is performed, for example, by heat-treating the polyphenylene ether melt-spun short fiber at 120 to 240° C. for 1 to 30 hours in air to make the short fiber infusible (infusibilization treatment), and then heat-treating the short fiber at 260 to 400° C. for 0.1 to 10 hours in air to make the short fiber flameproof (flameproof treatment).

In the infusibilization treatment, the polyphenylene ether melt-spun short fiber is treated in air at 120 to 240° C. for 1 to 30 hours. Here, "in air" refers to an environment which is not particularly adjusted. A treatment temperature is 120 to 240° C., preferably 140 to 230° C., and more preferably 160 to 220° C. A treatment time is 1 to 30 hours, preferably 1.5 to 25 hours, and more preferably 2 to 20 hours. By setting the treatment time and the treatment temperature as described above, it is possible to subject the polyphenylene ether melt-spun short fiber to an appropriate flameproof treatment without melting the polyphenylene ether melt-spun short fiber in the flameproof treatment to be subsequently performed.

After the infusibilization treatment, the flameproof treatment is performed in air at 260 to 400° C. for 0.1 to 10 hours. "In air" refers to an environment which is not particularly adjusted. A treatment temperature is 260 to 400° C., preferably 270 to 380° C., and more preferably 280 to 360° C. A treatment time is 0.1 to 10 hours, preferably 0.3 to 8 hours, and more preferably 0.5 to 6 hours. By setting the treatment time and the treatment temperature as described above, a C═O bond structure is formed in the polyphenylene ether melt-spun short fiber, and a flameproof short fiber exhibiting very high flame retardancy, flame resistance, and heat resistance and the like is obtained.

The fineness of the flameproof short fiber is not particularly limited, and can be appropriately determined depending on the use purpose of the fiber, but is, for example, preferably 100 dtex or less, more preferably 95 dtex or less, and still more preferably 90 dtex or less. The fineness is within the above range, whereby the flameproof short fiber can be processed into various shapes such as woven fabric, knitted fabric, short fiber nonwoven fabric, paper, and fabric shapes, which is preferable. The lower limit value of the fineness is not particularly limited, but is preferably 0.1 dtex or more, and more preferably 0.2 dtex or more.

The tensile strength of the flameproof short fiber is preferably 0.8 cN/dtex or more, more preferably 0.85 cN/dtex or more, and still more preferably 0.90 cN/dtex or more. The tensile strength is within the above range, whereby the handleability of the fiber is improved, which is preferable. The upper limit value of the tensile strength is not particularly limited, but is preferably 50 cN/dtex or less, and more preferably 40 cN/dtex or less.

The polyphenylene ether melt-spun short fiber of the present invention can be used for, for example, paper, a fabric, a heat-resistant binder, a C/C composite, a CFRP matrix resin, an industrial brush, and a brake material and the like.

<Paper Formed of Polyphenylene Ether Melt-Spun Fiber>

The paper of the present invention is formed of the polyphenylene ether melt-spun fiber. The paper can be produced by a general method, for example, by a wet papermaking method. In the wet papermaking method, for example, an aqueous slurry containing the polyphenylene ether melt-spun fiber may be prepared, followed by subjecting the aqueous slurry to an ordinary papermaking step. The aqueous slurry may contain a binder (for example, water-soluble polymer fibers such as a polyvinyl alcohol-based fiber, and heat-adhesive polymers fiber such as a polyethylene terephthalate fiber (PET fiber)) and the like. A fiber to be used as necessary may be subjected to a beating treatment. A hot pressing step may be subjected after the papermaking step in order to improve the uniformity and pressure-bonding properties of the paper.

The length of the polyphenylene ether melt-spun fiber used for producing paper is not particularly limited, but is preferably 0.5 mm or more, and more preferably 1 mm or more, and preferably 100 mm or less, and more preferably 80 mm or less from the viewpoint of achieving sufficient quality of the paper.

The paper of the present invention may contain other fibers; various additives such as a paper force promoter, a fixing agent, an antifoaming agent, a dye, an ultraviolet absorber, and a flame retardant; and various fillers such as talc, kaolin, calcium carbonate, and titanium dioxide depending on the purpose. These raw materials are often added to the aqueous slurry, but may be appropriately attached by coating or the like.

Examples of the other fibers include general-purpose fibers such as a polyolefin-based fiber, a polyester-based fiber, a polyamide-based fiber, a cellulose-based fiber, and a polysulfone-based fiber; and heat resistant fibers such as aromatic para-aramid, a polyaryl ketone-based fiber, and a polysulfone fiber.

The proportion of the polyphenylene ether melt-spun fiber contained in the paper of the present invention is, for example, 50 to 100% by mass, preferably 55 to 98% by mass, more preferably 60 to 95% by mass, and still more preferably 65 to 90% by mass, from the viewpoint of mechanical strength, flame retardancy, heat resistance, high-temperature stability, and chemical resistance and the like.

The weight per unit area of the paper of the present invention is not particularly limited, and can be appropriately adjusted depending on the application of the paper, but is usually 5 to 800 $g/cm^2$, preferably 7 to 700 $g/cm^2$, and more preferably 10 to 600 $g/cm^2$.

The tensile strength of the paper of the present invention is not particularly limited, but is usually 1 to 300 N/cm, preferably 3 to 250 N/cm, and more preferably 5 to 200 N/cm. The tensile strength is measured in accordance with JIS L1013 8.5.1.

The tensile elongation of the paper of the present invention is not particularly limited, but is usually 0.1 to 100%, preferably 0.3 to 90%, and more preferably 0.5 to 80%. The tensile elongation is measured in accordance with JIS L1013 8.5.1.

The LOI value of the paper of the present invention is not particularly limited, but is usually 25 to 80, preferably 27 to 75, and more preferably 30 to 70. The LOI value is measured in accordance with JIS L 1091E method.

The dielectric constant of the paper of the present invention is not particularly limited, but is usually 1.0 to 2.9, preferably 1.1 to 2.8, and more preferably 1.2 to 2.7.

The equilibrium moisture content of the paper of the present invention is not particularly limited, but is usually 0.01 to 1.5%, preferably 0.02 to 1.2%, and more preferably 0.03 to 1.0%. The equilibrium moisture content is measured in accordance with JIS L1013.

The high-temperature shrinkage ratio of the paper of the present invention at 190° C. is not particularly limited, but is usually 0.1 to 20%, preferably 0.2 to 15%, and more preferably 0.3 to 10%. A method for measuring the high-temperature shrinkage ratio at 190° C. is as described in Examples.

The paper of the present invention is preferably flameproof paper. The flameproof paper can be produced by the above method using the polyphenylene ether melt-spun fiber subjected to the flameproof treatment.

In the flameproof paper, the difference between weight reduction rates at 150° C. and 400° C. is preferably 5.0% or less, more preferably 4.0% or less, and still more preferably 3.5% or less. When the difference between the weight reduction rates is within the above range, deterioration in the polymer is suppressed, whereby the durability of the flameproof paper can be improved, which is preferable. The difference between the weight reduction rates is desirably 0%, but is usually about 0.1% or more, and may be about 0.15% or more.

The specific gravity of the flameproof paper is preferably 1.2 or more, more preferably 1.25 or more, and still more preferably 1.3 or more. The specific gravity is within the above range, whereby the flame retardation of the paper sufficiently proceeds to improve the flame resistance of the paper, which is preferable. The upper limit value of the specific gravity is not particularly limited, but is preferably 2.0 or less, and more preferably 1.8 or less.

The LOI value of the flameproof paper is preferably 30 or more, more preferably more than 30, still more preferably 32 or more, and particularly preferably 35 or more. The LOI value is within the above range, whereby the flame retardancy of the obtained flameproof paper is excellent, which is preferable. Here, the LOI value is a limiting oxygen index, and as the LOI value is larger, the flame retardancy is more excellent. Therefore, the LOI value is preferably larger, and the upper limit value thereof is not particularly limited.

The tensile elongation of the flameproof paper is preferably 5% or more, more preferably 7% or more, and still more preferably 10% or more. The tensile elongation is within the above range, whereby the processability of the flameproof paper can be improved, which is preferable. The upper limit value of the tensile strength is not particularly limited, but is preferably 100% or less, and more preferably 80% or less.

The strength retention of the flameproof paper at 400° C. is preferably 40% or more, more preferably 50% or more, and still more preferably 60% or more. The strength retention at 400° C. is within the above range, whereby the durability of the flameproof paper when used at a high temperature is high, which is preferable. The upper limit value of the strength retention at 400° C. is not particularly limited, but is preferably 100% or less, and more preferably 99% or less. Here, the strength retention at 400° C. refers to the retention of strength after a heat treatment at 400° C. for 10 minutes.

The elongation retention of the flameproof paper at 400° C. is preferably 40% or more, more preferably 50% or more, and still more preferably 55% or more. The elongation retention at 400° C. is within the above range, whereby the durability of the flameproof paper when used at a high temperature is high, which is preferable. The upper limit value of the elongation retention at 400° C. is not particularly limited, but is preferably 100% or less, and more preferably 99% or less. Here, the elongation retention at 400° C. refers to the retention of elongation after a heat treatment at 400° C. for 10 minutes.

The paper of the present invention can be used for, for example, a heat insulating material, a sound absorbing material, a heat resistant filter, heat resistant insulating paper, and an electromagnetic wave shielding material and the like.

<Fabric Formed of Polyphenylene Ether Melt-Spun Fiber>

The fabric of the present invention is formed of the polyphenylene ether melt-spun fiber. The fabric may further contain one or more fibers selected from the group consisting of a wholly aromatic polyester fiber, a polybenzoxazole (PBO) fiber, a polybenzimidazole (PBI) fiber, a polybenzothiazole (PBTZ) fiber, a polyimide (PI) fiber, a polysulfonamide (PSA) fiber, a polyether ether ketone (PEEK) fiber, a polyether imide (PEI) fiber, a polyarylate (PAr) fiber, a melamine fiber, a phenol fiber, a fluorine-based fiber, a polyphenylene sulfide (PPS) fiber, a cellulose fiber, a polyolefin fiber, an acrylic fiber, a rayon fiber, a cotton fiber, an animal hair fiber, a polyurethane fiber, a polyvinyl chloride fiber, a polyvinylidene chloride fiber, an acetate fiber, and a polycarbonate fiber.

The proportion of the polyphenylene ether melt-spun fiber contained in the fabric of the present invention is, for example, 50 to 100% by mass, preferably 55 to 98% by mass, more preferably 60 to 95% by mass, and still more preferably 65 to 90% by mass, from the viewpoint of mechanical strength, flame retardancy, heat resistance, high-temperature stability, and chemical resistance and the like.

The fabric of the present invention may contain additives such as a flame retardant, an ultraviolet absorber, a reflector, an organic dye, an organic pigment, and an inorganic pigment as necessary.

The fabric of the present invention can be produced by a general method, and examples thereof include a method in which spun yarns of the fibers are blended to obtain a blended spun yarn, and the spun yarn is then woven into a twill weave or a plain weave or the like using a rapier loom or the like as a single yarn or a double yarn.

The weight per unit area of the fabric of the present invention is not particularly limited, and can be appropriately adjusted depending on the application of the fabric, but is usually 10 to 3000 $g/cm^2$, preferably 20 to 2500 $g/cm^2$, and more preferably 30 to 2000 $g/cm^2$.

The LOI value of the fabric of the present invention is not particularly limited, but is usually 25 to 80, preferably 27 to 75, and more preferably 30 to 70. The LOI value is measured in accordance with JIS L 1091E method.

The high-temperature shrinkage ratio of the fabric of the present invention at 190° C. is not particularly limited, but is usually 0.1 to 20%, preferably 0.2 to 15%, and more preferably 0.3 to 10%. A method for measuring the high-temperature shrinkage ratio at 190° C. is as described in Examples.

The fabric of the present invention is preferably a flameproof fabric. The flameproof fabric may be produced by the method using the polyphenylene ether melt-spun fiber subjected to the flameproof treatment, or may be produced by preparing a fabric according to the method using the polyphenylene ether melt-spun fiber and then subjecting the prepared fabric to the flameproof treatment.

In the flameproof fabric, the difference between weight reduction rates at 150° C. and 400° C. is preferably 5.0% or less, more preferably 4.0% or less, and still more preferably 3.5% or less. When the difference between the weight reduction rates is within the above range, deterioration in the polymer is suppressed, whereby the durability of the flameproof fabric can be improved, which is preferable. The difference between the weight reduction rates is desirably 0%, but is usually about 0.1% or more, and may be about 0.15% or more.

The specific gravity of the flameproof fabric is preferably 1.2 or more, more preferably 1.25 or more, and still more preferably 1.3 or more. The specific gravity is within the above range, whereby the flame retardation of the fabric sufficiently proceeds, to improve the flame resistance of the fabric, which is preferable. The upper limit value of the specific gravity is not particularly limited, but is preferably 2.0 or less, and more preferably 1.8 or less.

The LOI value of the flameproof fabric is preferably 30 or more, more preferably more than 30, still more preferably 32 or more, and particularly preferably 35 or more. The LOI value is within the above range, whereby the flame retardancy of the obtained flameproof fabric is excellent, which is preferable. Here, the LOI value is a limiting oxygen index, and as the LOI value is larger, the flame retardancy is more excellent. Therefore, the LOI value is preferably larger, and the upper limit value thereof is not particularly limited.

The tensile elongation of the flameproof fabric is preferably 5% or more, more preferably 7% or more, and still more preferably 10% or more. The tensile elongation is within the above range, whereby the processability of the flameproof fabric can be improved, which is preferable. The upper limit value of the tensile strength is not particularly limited, but is preferably 100% or less, and more preferably 80% or less.

The strength retention of the flameproof fabric at 400° C. is preferably 40% or more, more preferably 50% or more, and still more preferably 60% or more. The strength retention at 400° C. is within the above range, whereby the durability of the flameproof fabric when used at a high temperature is high, which is preferable. The upper limit value of the strength retention at 400° C. is not particularly limited, but is preferably 100% or less, and more preferably 99% or less. Here, the strength retention at 400° C. refers to the retention of strength after a heat treatment at 400° C. for 10 minutes.

The elongation retention of the flameproof fabric at 400° C. is preferably 40% or more, more preferably 50% or more, and still more preferably 55% or more. The elongation retention at 400° C. is within the above range, whereby the durability of the flameproof fabric when used at a high temperature is high, which is preferable. The upper limit value of the elongation retention at 400° C. is not particularly limited, but is preferably 100% or less, and more preferably 99% or less. Here, the elongation retention at 400° C. refers to the retention of elongation after a heat treatment at 400° C. for 10 minutes.

The fabric of the present invention can be used for, for example, a heat insulating material, a work wear (for fire, for race, for flyer), a heat-resistant glove, a disaster-prevention hood, an interior material for transporting device, a heat-resistant clothing material, and an electromagnetic wave shielding material and the like.

<Film>

The polyphenylene ether melt extrusion formed body of the present invention is preferably a film. The film can be produced by the method described above.

The elastic modulus of the film is not particularly limited, but is usually 1000 to 4500 MPa, preferably 1200 to 4000 MPa, and more preferably 1500 to 3500 MPa. The elastic modulus is measured in accordance with JIS K7127.

The maximum point stress of the film is not particularly limited, but is usually 30 to 300 MPa, preferably 40 to 250 MPa, and more preferably 50 to 200 MPa. The maximum point stress is measured in accordance with JIS K7127.

The strain at break of the film is not particularly limited, but is usually 1 to 100%, preferably 3 to 80%, and more preferably 5 to 70%. The strain at break is measured in accordance with JIS K7127.

The dielectric constant of the film is not particularly limited, but is usually 1.8 to 3.2, preferably 1.9 to 3.1, and more preferably 2.0 to 3.0. The dielectric constant is measured in accordance with JIS C2565.

The dielectric loss tangent of the film is not particularly limited, but is usually 0.0003 to 0.02, preferably 0.0005 to 0.015, and more preferably 0.001 to 0.01. The dielectric constant is measured in accordance with JIS C2565.

The film is preferably a flameproof film.

The flameproof film is obtained by subjecting the film to the flameproof treatment.

The elastic modulus of the flameproof film is not particularly limited, but is usually 1500 to 5500 MPa, preferably 2000 to 5000 MPa, and more preferably 2500 to 4500 MPa. The elastic modulus is measured in accordance with JIS K7127.

The maximum point stress of the flameproof film is not particularly limited, but is usually 1 to 40 MPa, preferably 2 to 30 MPa, and more preferably 3 to 25 MPa. The maximum point stress is measured in accordance with JIS K7127.

The strain at break of the flameproof film is not particularly limited, but is usually 1 to 50%, preferably 2 to 40%, and more preferably 3 to 30%. The strain at break is measured in accordance with JIS K7127.

The dielectric constant of the flameproof film is not particularly limited, but is usually 2.0 to 3.6, preferably 2.2 to 3.4, and more preferably 2.4 to 3.2. The dielectric constant is measured in accordance with JIS C2565.

The dielectric loss tangent of the flameproof film is not particularly limited, but is usually 0.003 to 0.03, preferably 0.004 to 0.025, and more preferably 0.005 to 0.02. The dielectric constant is measured in accordance with JIS C2565.

The film of the present invention can be used for, for example, an FPC substrate, a coverlay, an adhesive tape substrate, a release film for forming a laminated substrate, a transparent heat-resistant protective film, and a special release film for heat-resistant substrate, and the like.

EXAMPLES

Hereinafter, the present invention will be more specifically described with reference to Examples and Comparative Examples, but the present invention is not limited to the following Examples. The evaluation methods of physical properties and the like in the following Examples are as follows.

(1) Fineness and Single Filament Fineness

Measurement was performed by a method described in JIS L-1095 9.4.1. A single filament fineness was calculated by dividing a fineness by the number of filaments.

(2) Maximum Point Stress and Maximum Point Elongation

Measurement was performed in accordance with JIS L1013 8.5.1. Stress at a maximum load was defined as maximum point stress, and an elongation rate at a maximum load was defined as maximum point elongation.

(3) Glass Transition Temperature

Using a differential scanning calorimeter (Model DSC-Q100) manufactured by TA Instruments, 2 mg of a formed body (fiber) was measured at a temperature increasing rate of 10° C./min from 30° C. to 250° C. in a nitrogen atmosphere, and a temperature at an intersection of an extended line of a baseline lower than or equal to a glass transition temperature and a tangent indicating maximum inclination in a transition portion was defined as the glass transition temperature (Tg).

(4) Amount of Rearrangement Structure in Formed Body $^1$H-NMR measurement was performed at a resonance frequency of 600 MHz. As a measuring apparatus, an NMR apparatus (apparatus name: AVANCE-NEO600) manufactured by Bruker Corporation was used to perform measurement as follows.

10 mg of each of the formed bodies (samples) obtained in Examples and Comparative Examples was dissolved in deuterated chloroform, and the solution was then filled in an NMR tube within 2 hours to perform measurement. Deuterated chloroform was used as a lock solvent. A waiting time was set to 1 second; a data capture time was set to 4 seconds, and the number of times of integration was set to 64.

Deuterated benzene may be used as the solvent.

The amount of a rearrangement structure was analyzed as follows.

A peak integral value of peaks derived from protons of $R^1$ and $R^2$ groups at the 3 and 5 positions of polyphenylene ether and a peak integral value of peaks derived from protons of a divalent group (methylene group or the like) represented by $R^{3'}$ in a rearrangement structure were respectively defined as A and B, and the amount of the rearrangement structure was determined by the following formula.

$$\text{Amount of rearrangement structure (mol \%)}=(B/(A+B))\times 100$$

(5) Weight Average Molecular Weight (Mw) and Number Average Molecular Weight (Mn)

As a measuring apparatus, HLC-8320GPC manufactured by Tosoh Corporation was used. As a column, two TSKgel SuperHM-H columns and one TSKgel SuperH 2000 column were connected in series and used. Chloroform was used as a mobile phase; a flow rate was set to 0.6 ml/min; and the temperature of a column oven was set to 40° C. A chloroform solution having a concentration of 1 g/L was prepared from the formed body to perform measurement. A weight average molecular weight and a number average molecular weight were calculated by preparing a calibration curve using standard polystyrene. The UV wavelength of a detector was set to 283 nm in the case of an object to be evaluated, and 254 nm in the case of the standard polystyrene. In Examples 1 to 7 and Comparative Example 2, a released yarn (a yarn obtained by freely dropping a polymer discharged from a nozzle) as the "formed body" was used to perform measurement.

(6) Peripheral Speed of Screw

The peripheral speed of a screw was obtained by the following formula.

$$\text{Peripheral speed of screw (m/min)}=\text{diameter of screw (mm)}\times 0.00314\times\text{rotation speed of screw (rpm)}$$

<Polyphenylene Ether Melt-Spun Fiber>

Example 1

Poly(2,6-dimethyl-1,4-phenylene ether) (PPO640 manufactured by SABIC Innovative Plastics, glass transition temperature (Tg): 221° C.) was extruded using a twin screw extruder (product name: KZW15TW-30MG) manufactured by Technovel corporation. The twin screw extruder included a cylinder having four zones. The cylinder included cylinders 1, 2, 3, and 4 from a hopper side. The cylinders 1 to 3 were set to 280° C., and the cylinder 4 and a cylinder head portion were set to 300° C. The rotation speed of a screw was set to 700 rpm to set the peripheral speed of the screw to 33.0 m/min.

A gear pump was placed downstream of the extruder to meter the discharge speed of a polymer, and the polymer was extruded through a metallic nonwoven filter (product name: NF-07, manufactured by Nippon Seisen Co., Ltd.) to a nozzle (diameter of nozzle hole: 0.23 mm, land length of nozzle hole: 0.3 mm, number of nozzle holes: 24) (total discharge amount: 3.5 g/min, single hole discharge amount: 0.146 g/min). A planar heater was disposed immediately below the nozzle to set a nozzle temperature to 316° C. A heat-retaining space of 60 mm was provided immediately below the nozzle, and nitrogen heated to 300° C. was continuously introduced into this region. The polymer discharged from the nozzle was wound up at a spinning speed of 100 m/min. The obtained melt-spun fiber had a fineness of 355 dtex, a single filament fineness of 14.8 dtex, maximum point stress of 0.95 cN/dtex, maximum point elongation of 92.9%, and a glass transition temperature of 204° C. The amount of the rearrangement structure in the obtained fiber was 2.8 mol % with respect to all PPE units.

The obtained fiber was subjected to $^1$H-NMR measurement based on the measuring method in the "(4) Amount of rearrangement structure in formed body (Fiber)" described above. As a result, when deuterated chloroform was 7.28 ppm, peaks were observed at around 6.9 ppm, around 6.48 ppm, and around 3.87 ppm. The peak at around 6.9 ppm corresponded to protons at the 3 and 5 positions of the polyphenylene ether generated by rearrangement (that is, in the rearrangement structure). The peak at around 6.48 ppm corresponded to protons at the 3 and 5 positions of the polyphenylene ether in the main chain. The peak at around 3.87 ppm corresponded to methylene of a methylene bridge generated by rearrangement.

When the deuterated benzene was used as the solvent, and was 7.1 ppm, peaks were observed at around 6.8 ppm and around 3.7 ppm. The peak at around 6.9 ppm corresponded to protons at the 3 and 5 positions of the polyphenylene ether generated by rearrangement (that is, in the rearrangement structure). The peak at around 3.7 ppm corresponded to methylene protons of a methylene bridge generated by rearrangement.

Examples 2 to 6

Melt-spun fibers were obtained in the same manner as in Example 1 except that the rotation speed of a screw, the peripheral speed of the screw, the shape of a nozzle, and spinning conditions were changed as shown in Table 1. The fiber properties and released yarn properties of the obtained fiber are shown in Table 1.

Example 7

A melt-spun fiber was obtained in the same manner as in Example 1 except that a blend of 90 parts of poly(2,6-dimethyl-1,4-phenylene ether) (PPO640, glass transition temperature (Tg): 221° C., manufactured by SABIC Innovative Plastics) and 10 parts of poly(2,6-dimethyl-1,4-phenylene ether) (PPOSA120, glass transition temperature (Tg): 159° C., manufactured by SABIC Innovative Plastics) was used, and spinning conditions were changed as shown in Table 1. The fiber properties and released yarn properties of the obtained fiber are shown in Table 1.

Example 8

A melt-spun fiber was obtained in the same manner as in Example 5 except that the peripheral speed of a screw was changed to 3.8 m/min. The fiber properties and released yarn properties of the obtained fiber are shown in Table 1.

Comparative Example 1

In Comparative Example 1, an attempt was made to produce a melt-spun fiber in the same manner as in Example 1 except that the rotation speed of a screw was set to 50 rpm, that is, the peripheral speed of the screw was set to 2.4 m/min, but the viscosity of a polymer was too high to extrude the polymer from a gear pump, resulting in the destruction of the gear pump.

Comparative Example 2

Melt-spinning was performed in the same manner as in Example 1 except that a blend of 80 parts of poly(2,6-dimethyl-1,4-phenylene ether) (PPO 640, manufactured by SABIC Innovative Plastics) and 20 parts of polystyrene (679, manufactured by PS Japan Corporation) was used, and spinning conditions were changed as shown in Table 1. However, the spinnability was very poor, and a fiber having a single filament fineness of 78.4 dtex could be finally obtained at a spinning speed of 30 m/min by increasing a single hole discharge amount to 0.242 g/min. The fiber properties and released yarn properties of the obtained fiber are shown in Table 1.

The melt-spun fibers obtained in Examples had excellent maximum point stress and elongation at break. By contrast, in Comparative Example 1, the melt-spun fiber could not be obtained. This is considered as follows. In Comparative Example 1, the peripheral speed of the screw is low to cause an insufficient shear force, whereby no rearrangement structure is formed in the polyphenylene ether. The polymer has a too high viscosity, whereby the polymer cannot be extruded from the gear pump. In Comparative Example 2, though polystyrene was blended in poly(2,6-dimethyl-1,4-phenylene ether), the spinnability was very poor, whereby only a very thick fiber could be obtained. The obtained fiber had low strength, low elongation, and a low glass transition temperature.

TABLE 1

| | | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|---|
| Resin | PPE (640) | 100 | 100 | 100 | 100 | 100 | 100 | 90 | 100 | 100 | 80 |
| raw | PPE (SA120) | 0 | 0 | 0 | 0 | 0 | 0 | 10 | 0 | 0 | 0 |
| material | PS (679) | 0 | 0 | 0 | 0 | 0 | 0 | 0 | 0 | 0 | 20 |
| Screw rotation speed (rpm) | | 700 | 700 | 700 | 700 | 550 | 450 | 700 | 80 | 50 | 200 |
| Peripheral speed of screw (m/min) | | 33.0 | 33.0 | 33.0 | 33.0 | 25.9 | 21.2 | 33.0 | 3.8 | 2.4 | 9.4 |
| Diameter of nozzle hole (mm) | | 0.23 | 0.23 | 0.23 | 0.45 | 0.45 | 0.45 | 0.23 | 0.45 | 0.23 | 0.45 |
| Land length of nozzle hole (mm) | | 0.3 | 0.3 | 0.3 | 1.35 | 1.35 | 1.35 | 0.3 | 1.35 | 0.3 | 1.35 |
| Number of nozzle holes | | 24 | 24 | 24 | 48 | 48 | 48 | 24 | 48 | 24 | 24 |
| Total discharge amount (g/min) | | 3.5 | 3.3 | 3.3 | 3.9 | 3.9 | 3.9 | 2.9 | 3.9 | — | 5.8 |
| Single hole discharge amount (g/min) | | 0.146 | 0.138 | 0.138 | 0.081 | 0.081 | 0.081 | 0.121 | 0.081 | — | 0.242 |
| Spinning speed (m/min) | | 100 | 150 | 200 | 160 | 80 | 80 | 120 | 80 | — | 30 |
| Fineness (dtex) | | 355 | 226 | 158 | 245 | 507 | 503 | 250 | 505 | — | 1883 |
| Single filament fineness (dtex) | | 14.8 | 9.4 | 6.6 | 5.1 | 10.6 | 10.5 | 10.4 | 10.5 | — | 78.4 |
| Maximum point stress (cN/dtex) | | 0.95 | 1.35 | 1.32 | 1.34 | 1.26 | 1.69 | 1.21 | 1.38 | — | 0.66 |
| Maximum point elongation (%) | | 92.9 | 86.4 | 70.7 | 40 | 70.2 | 46.6 | 94.8 | 65.2 | — | 4.58 |
| Glass transition temperature (° C.) | | 204 | 203 | 203 | 205 | 207 | 208 | 200 | 208 | — | 176 |
| Amount of rearrangement structure (mol % vs PPE unit) in formed body (fiber) | | 2.8 | 2.8 | 2.8 | 2.7 | 1.4 | 0.8 | 2.4 | 0.05 | — | No peak |
| Weight average molecular weight in released yarn (Mw) | | 53000 | 53000 | 53000 | 52600 | 51500 | 49300 | 42700 | 47800 | — | 45800 |
| Number average molecular weight in released yarn (Mn) | | 10700 | 10700 | 10700 | 11000 | 11400 | 12200 | 10100 | 11500 | — | 12100 |
| Molecular weight dispersion in released yarn (Mw/Mn) | | 4.95 | 4.95 | 4.95 | 4.78 | 4.52 | 4.04 | 4.23 | 4.16 | — | 3.79 |

In Table 1, "640" represents poly(2,6-dimethyl-1,4-phenylene ether) (PPO640, glass transition temperature (Tg): 221° C., manufactured by SABIC Innovative Plastics); "SA120" represents poly(2,6-dimethyl-1,4-phenylene ether) (PPOSA120, glass transition temperature (Tg): 159° C., manufactured by SABIC Innovative Plastics); and "PS (679)" represents polystyrene (679, manufactured by PS Japan Corporation).

As shown in Table 1, in Examples of the present invention, though only poly(2,6-dimethyl-1,4-phenylene ether) was used, the peripheral speed of the screw was high to apply a strong shearing force, whereby the rearrangement structures were generated to obtain the melt-spun fibers. In particular, in Examples 3 and 4, the thin fibers having single filament finenesses of 6.6 dtex and 5.1 dtex were obtained.

<Polyphenylene Ether Melt-Spun Short Fiber>

Example 9

A tow fiber obtained by joining the melt-spun fibers obtained in Example 1 was cut into a fiber length of 50 mm with a guillotine cutter to obtain a short fiber.

(1) Tensile Strength and Tensile Elongation

Measurement was performed in accordance with JIS L1013 8.5.1. Stress at a maximum load was defined as tensile strength, and an elongation rate at a maximum load was defined as tensile elongation.

(2) High-Temperature Shrinkage Ratio

A short fiber cut out into 5 cm was held in an air thermostatic bath maintained at 190° C. for 10 min with the ends of the short fiber not fixed, and the high-temperature shrinkage ratio of the short fiber was then calculated using the following formula from the fiber length (X cm) of the short fiber. However, when the short fiber of 5 cm cannot be obtained, the length of the short fiber may be appropriately changed for measurement.

High-temperature shrinkage ratio (%)=<X/5>×100

(<X/length before treatment>×100 when the short fiber of 5 cm cannot be obtained)

(3) Equilibrium Moisture Content

In accordance with JIS L1013, a sample was completely dried in an atmosphere at 120° C., and then adjusted at a temperature of 20° C. and a relative humidity of 65% RH for 72 hours. The content of moisture contained in the sample with respect to the mass of the completely dried sample was calculated, and expressed in percentage (%).

TABLE 2

| | Example 9 |
|---|---|
| Tensile strength (cN/dtex) | 1.12 |
| Tensile elongation (%) | 120 |
| High-temperature shrinkage ratio at 190° C. (%) | 2.1 |
| Equilibrium moisture content (%) | 0.2 |

<Flameproof Short Fiber>

Example 10

A tow fiber obtained by joining the melt-spun fibers obtained in Example 1 was cut into a fiber length of 50 mm with a guillotine cutter to obtain a short fiber. The obtained short fiber was heat-treated in the order of 200° C.×120 min, 210° C.×20 min, 220° C.×20 min, 250° C.×120 min, 280° C.×120 min, and 320° C.×120 min in an air atmosphere to prepare a flameproof short fiber.

(1) Tensile Strength and Tensile Elongation

Measurement was performed in accordance with JIS L1013 8.5.1. Stress at a maximum load was defined as tensile strength, and an elongation rate at a maximum load was defined as tensile elongation.

(2) High-Temperature Shrinkage Ratio

The flameproof short fiber cut out into 5 cm was held in an air thermostatic bath maintained at 190° C. for 10 min with the ends of the flameproof short fiber not fixed, and the high-temperature shrinkage ratio of the flameproof short fiber was then calculated using the following formula from the fiber length (X cm) of the flameproof short fiber. However, when the flameproof short fiber of 5 cm cannot be obtained, the length of the flameproof short fiber may be appropriately changed for measurement.

High-temperature shrinkage ratio (%)=<X/5>×100

(<X/length before treatment>×100 when the flameproof short fiber of 5 cm cannot be obtained)

(3) Equilibrium Moisture Content

In accordance with JIS L1013, a sample was completely dried in an atmosphere at 120° C., and then adjusted at a temperature of 20° C. and a relative humidity of 65% RH for 72 hours. The content of moisture contained in the sample with respect to the mass of the completely dried sample was calculated, and expressed in percentage (%).

(4) Generated Gas

Measurement was performed in accordance with STM E662.

(5) Smoke Amount

Measurement was performed in accordance with BSS 7239.

TABLE 3

| | Example 10 |
|---|---|
| Tensile strength (cN/dtex) | 1.58 |
| Tensile elongation (%) | 12 |
| High-temperature shrinkage ratio at 190° C. (%) | 0.5 |
| Equilibrium moisture content (%) | 9.2 |
| Generated gas (HCN) (ppm) | Less than 0.5 |
| Smoke amount | 0.2 |

<Paper Formed of Polyphenylene Ether Melt-Spun Fiber>

Example 11

A tow fiber obtained by joining the melt-spun fibers obtained in Example 1 was cut into a fiber length of 5 mm with a guillotine cutter to obtain a short fiber. The obtained short fiber was subjected to wet papermaking. A surfactant "Meikasurf MK-37" manufactured by Meisei Chemical Works, Ltd. was used during papermaking. The obtained paper was placed on an aluminum foil, and washed with about 5 L of ion-exchanged water using a spray. The paper was sandwiched between aluminum foils, followed by performing calender pressing at a temperature of 210° C., a linear pressure of 30 kg/cm (calculated as a width of 25 cm), and a roller speed of 1.0 m/min to prepare paper (basis weight: 320 g/cm$^2$).

(1) Tensile Strength and Tensile Elongation

Measurement was performed in accordance with JIS L1013 8.5.1. A sample having a width of 25 mm and a length of 100 mm was used to perform the measurement with a distance between chucks of 50 mm and a tensile speed of 100 mm/min. Tensile elongation was defined as elongation when strength was maximized.

(2) LOI Value

Measurement was performed in accordance with JIS L 1091 E method. An oxygen index was determined when combustion was continued for 50 mm or more, and propane gas was used as a heat source of an igniter.

(3) Dielectric Constant

The dielectric constant of a sample having a thickness of 50 μm was measured by a cavity resonator method (TM mode) in accordance with JIS C2565 using a dielectric measurement device manufactured by AET, INC. The measurement was performed at a frequency of 10 GHz. The sample size is 3 mm in width and 80 mm in length.

(4) Equilibrium Moisture Content

In accordance with JIS L1013, a sample was completely dried in an atmosphere at 120° C., and then adjusted at a temperature of 20° C. and a relative humidity of 65% RH for 72 hours. The content of moisture contained in the sample with respect to the mass of the completely dried sample was calculated, and expressed in percentage (%).

(5) High-Temperature Shrinkage Ratio

Paper cut out into a size of 10 cm square was held in an air thermostatic bath maintained at 190° C. for 10 min with the ends of the paper not fixed, and the high-temperature shrinkage ratio of the paper was then calculated using the following formula from the paper length (X cm) of the paper.

High-temperature shrinkage ratio (%)=<X/10>×100

TABLE 4

| | Example 11 |
|---|---|
| Tensile strength (N/cm) | 150 |
| Tensile elongation (%) | 15 |
| LOI value | 27 |
| Dielectric constant | 1.87 |
| Equilibrium moisture content (%) | 0.2 |
| High-temperature shrinkage ratio at 190° C. (%) | 2.5 |

<Flameproof Paper>

Example 12

The paper prepared in Example 11 was heat-treated in the order of 200° C.×120 min, 210° C.×20 min, 220° C.×20 min, 250° C.×120 min, 280° C.×120 min, and 320° C.×120 min in an air atmosphere to prepare flameproof paper.

(1) Tensile Strength and Tensile Elongation

Measurement was performed in accordance with JIS L1013 8.5.1. A sample having a width of 25 mm and a length of 100 mm was used to perform the measurement with a distance between chucks of 50 mm and a tensile speed of 100 mm/min. Tensile elongation was defined as elongation when strength was maximized.

(2) Generated Gas

Measurement was performed in accordance with STM E662.

(3) Smoke Amount

Measurement was performed in accordance with BSS 7239.

(4) LOI Value

Measurement was performed in accordance with JIS L 1091 E method. An oxygen index was determined when combustion was continued for 50 mm or more, and propane gas was used as a heat source of an igniter.

(5) Dielectric Constant

The dielectric constant of a sample having a thickness of 50 μm was measured by a cavity resonator method (TM mode) in accordance with JIS C2565 using a dielectric measurement device manufactured by AET, INC. The measurement was performed at a frequency of 10 GHz. The sample size is 3 mm in width and 80 mm in length.

(6) Equilibrium Moisture Content

In accordance with JIS L1013, a sample was completely dried in an atmosphere at 120° C., and then adjusted at a temperature of 20° C. and a relative humidity of 65% RH for 72 hours. The content of moisture contained in the sample with respect to the mass of the completely dried sample was calculated, and expressed in percentage (%).

(7) High-Temperature Shrinkage Ratio

Flameproof paper cut out into a size of 10 cm square was held in an air thermostatic bath maintained at 190° C. for 10 min with the ends of the flameproof paper not fixed, and the high-temperature shrinkage ratio of the flameproof paper was then calculated using the following formula from the paper length (X cm) of the flameproof paper.

High-temperature shrinkage ratio (%)=<X/10>×100

TABLE 5

| | Example 12 |
|---|---|
| Tensile strength (N/cm) | 180 |
| Tensile elongation (%) | 5 |
| Generated gas (HCN) (ppm) | Less than 0.5 |
| Smoke amount | 0.1 |
| LOI value | 42 |
| Dielectric constant | 2.04 |
| Equilibrium moisture content (%) | 9.2 |
| High-temperature shrinkage ratio at 190° C. (%) | 1.0 |

<Fabric Formed of Polyphenylene Ether Melt-Spun Fiber>

Example 13

The melt-spun fiber obtained in Example 1 was woven to obtain a flat woven fabric having a weight per unit area of 150 g/m$^2$.

(1) LOI Value

Measurement was performed in accordance with JIS L 1091 E method. An oxygen index was determined when combustion was continued for 50 mm or more, and propane gas was used as a heat source of an igniter.

(2) High-Temperature Shrinkage Ratio

A fabric cut out into a size of 10 cm square was held in an air thermostatic bath maintained at 190° C. for 10 min with the ends of the fabric not fixed, and the high-temperature shrinkage ratio of the fabric was then calculated using the following formula from the fabric length (X cm) of the fabric.

High-temperature shrinkage ratio (%)=<X/10>×100

TABLE 6

| | Example 13 |
|---|---|
| LOI value | 27 |
| High-temperature shrinkage ratio at 190° C. (%) | 3.2 |

<Flameproof Fabric>

Example 14

The flat woven fabric prepared in Example 13 was heat-treated in the order of 200° C.×120 min, 210° C.×20 min, 220° C.×20 min, 250° C.×120 min, 280° C.×120 min, and 320° C.×120 min in an air atmosphere to prepare a flameproof fabric.

(1) Generated Gas

Measurement was performed in accordance with STM E662.

(2) Smoke Amount

Measurement was performed in accordance with BSS 7239.

(3) LOI Value

Measurement was performed in accordance with JIS L 1091 E method. An oxygen index was determined when combustion was continued for 50 mm or more, and propane gas was used as a heat source of an igniter.

(4) High-Temperature Shrinkage Ratio

A flameproof fabric cut out into a size of 10 cm square was held in an air thermostatic bath maintained at 190° C.

for 10 min with the ends of the flameproof fabric not fixed, and the high-temperature shrinkage ratio of the flameproof fabric was then calculated using the following formula from the fabric length (X cm) of the flameproof fabric.

High-temperature shrinkage ratio (%)=<X/10>×100

TABLE 7

| | Example 14 |
|---|---|
| Generated gas (HCN) (ppm) | Less than 0.5 |
| Smoke amount | 0.3 |
| LOI value | 40 |
| High-temperature shrinkage ratio at 190° C. (%) | 1.4 |

<Molten Polyphenylene Ether Film>

Example 15

Poly(2,6-dimethyl-1,4-phenylene ether) (PPO640 manufactured by SABIC Innovative Plastics, glass transition temperature (Tg): 221° C.) was extruded using a twin screw extruder (product name: KZW15TW-45MG) manufactured by Technovel corporation. The temperature of the twin screw extruder was set to 300° C. The rotation speed of a screw was set to 700 rpm to set the peripheral speed of the screw to 33.0 m/min.

A gear pump was placed downstream of the extruder to meter the discharge speed of a polymer, and the polymer was extruded into a T-die (TDS/150-SGI) manufactured by Technovel corporation at a discharge amount of 22.5 g/min. The polymer extruded from the T-die was wound with a roll (FPU-200-SGI) manufactured by Technovel corporation at a take-up speed of 3 m/min to prepare a molten polyphenylene ether film.

Comparative Example 3

In Comparative Example 3, an attempt was made to produce a film in the same manner as in Example 15 except that the rotation speed of a screw was set to 50 rpm, that is, the peripheral speed of the screw was set to 2.4 m/min, but the viscosity of a polymer was too high to extrude the polymer from a gear pump, whereby the film could not be formed.

(1) Elastic Modulus, Maximum Point Stress, and Strain at Break

In accordance with JIS K7127, the elastic modulus in an MD direction, maximum point stress, and strain at break of the film were measured at 23° C.

(2) Dielectric Constant and Dielectric Loss Tangent

The dielectric constant and dielectric loss tangent of a film having a thickness of 50 μm were measured by a cavity resonator method (TM mode) in accordance with JIS C2565 using a dielectric measurement device manufactured by AET, INC. The measurement was performed at a frequency of 10 GHz. The sample size is 3 mm in width and 80 mm in length.

TABLE 8

| | Example 15 | Comparative Example 3 |
|---|---|---|
| Resin raw material | PPE640 | PPE640 |
| Screw rotation speed (rpm) | 700 | 50 |
| Peripheral speed of screw (m/min) | 33.0 | 2.4 |
| Extrusion temperature (° C.) | 300 | 300 |
| Discharge amount (g/min) | 20 | 20 |
| Average thickness (μm) | 50 | — |
| Tg (° C.) | 205 | — |
| Amount of rearrangement of methylene bridge (mol %) | 2.0 | — |
| Elastic modulus (MPa) | 2786 | — |
| Maximum point stress (MPa) | 92.6 | — |
| Strain at break (%) | 95.7 | — |
| Dielectric constant | 2.65 | — |
| Dielectric loss tangent | 0.0039 | — |

<Flameproof Film>

Example 16

A molten polyphenylene ether film prepared in Example 15 was heat-treated in the order of 200° C.×120 min, 210° C.×20 min, 220° C.×20 min, 250° C.×120 min, 280° C.×120 min, and 320° C.×120 min in an air atmosphere to prepare a flameproof film.

(1) Elastic Modulus, Maximum Point Stress, and Strain at Break

In accordance with JIS K7127, the elastic modulus in an MD direction, maximum point stress, and strain at break of the flameproof film were measured at 23° C.

(2) Dielectric Constant and Dielectric Loss Tangent

The dielectric constant and dielectric loss tangent of the flameproof film having a thickness of 50 μm were measured by a cavity resonator method (TM mode) in accordance with JIS C2565 using a dielectric measurement device manufactured by AET, INC. The measurement was performed at a frequency of 10 GHz. The sample size is 3 mm in width and 80 mm in length.

TABLE 9

| | Example 16 |
|---|---|
| Resin raw material | PPE640 |
| Screw rotation speed (rpm) | 700 |
| Peripheral speed of screw (m/min) | 33.0 |
| Extrusion temperature (° C.) | 300 |
| Discharge amount (g/min) | 20 |
| Average thickness (μm) | 50 |
| Tg (° C.) | 205 |
| Amount of rearrangement of methylene bridge (mol %) | 2.0 |
| Elastic modulus (MPa) | 3542 |
| Maximum point stress (MPa) | 12 |
| Strain at break (%) | 15 |
| Dielectric constant | 2.85 |
| Dielectric loss tangent | 0.0112 |

DESCRIPTION OF REFERENCE SIGNS

1 Hopper
2 Extruder
3 Gear pump
4 Filter
5 Spinning nozzle
6 Filter material
7 Heat-retaining space
8 Introducing of an inert gas
9 Heating torch

The invention claimed is:

1. A polyphenylene ether melt extrusion formed body comprising a polyphenylene ether component which has a rearrangement structure having a continuous structure bonded at an ortho-position in a repeating unit continuously bonded at a para-position,
 wherein a content of the polyphenylene ether component is 95% by mass or more in all components forming the formed body,
 an amount of rearrangement in the polyphenylene ether component having the rearrangement structure is 0.05 mol % or more with respect to all polyphenylene ether structural units in the polyphenylene ether component, and
 the polyphenylene ether melt extrusion formed body is a polyphenylene ether melt-spun fiber.

2. The polyphenylene ether melt extrusion formed body according to claim 1,
 wherein:
 the repeating unit continuously bonded at a para-position is represented by the following general formula (1):

[Formula 1]

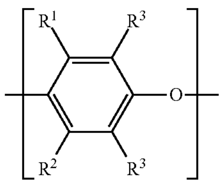

(1)

wherein: $R^1$ and $R^2$ are each independently a hydrogen atom or a hydrocarbon group having 1 to 10 carbon atoms which may have a substituent; and $R^3$ is each independently a hydrocarbon group having 1 to 10 carbon atoms which may have a substituent; and
 the rearrangement structure is represented by the following general formula (2):

[Formula 2]

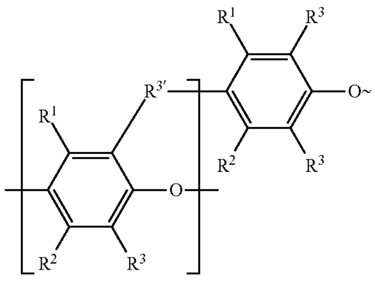

(2)

wherein: $R^1$ and $R^2$ are each independently a hydrogen atom or a hydrocarbon group having 1 to 10 carbon atoms which may have a substituent; $R^3$ is each independently a hydrocarbon group having 1 to 10 carbon atoms which may have a substituent; and $R^{3'}$ represents a divalent group in which one hydrogen atom is removed from $R^3$.

3. The polyphenylene ether melt extrusion formed body according to claim 1, wherein the rearrangement structure exhibits a peak in a range of 6.8 to 7.0 ppm and a peak in a range of 3.8 to 4.0 ppm in nuclear magnetic resonance spectrum (1H-NMR) measurement.

4. The polyphenylene ether melt extrusion formed body according to claim 1, wherein the polyphenylene ether melt extrusion formed body has a glass transition temperature of 190° C. or higher and 210° C. or lower.

5. The polyphenylene ether melt extrusion formed body according to claim 1, wherein the polyphenylene ether melt-spun fiber has a single filament fineness of 1.0 dtex or more and 100 dtex or less.

6. The polyphenylene ether melt extrusion formed body according to claim 1, wherein the polyphenylene ether melt-spun fiber is a short fiber.

7. The polyphenylene ether melt extrusion formed body according to claim 6, wherein the short fiber is a flameproof short fiber.

8. The polyphenylene ether melt extrusion formed body according to claim 6, wherein the polyphenylene ether melt extrusion formed body is paper formed of the polyphenylene ether melt-spun fiber.

9. The polyphenylene ether melt extrusion formed body according to claim 8, wherein the paper is flameproof paper.

10. The polyphenylene ether melt extrusion formed body according to claim 1, wherein the polyphenylene ether melt extrusion formed body is a fabric formed of the polyphenylene ether melt-spun fiber.

11. The polyphenylene ether melt extrusion formed body according to claim 10, wherein the fabric is a flameproof fabric.

12. The polyphenylene ether melt extrusion formed body according to claim 1, wherein the polyphenylene ether melt extrusion formed body is a film.

13. The polyphenylene ether melt extrusion formed body according to claim 12, wherein the film is a flameproof film.

* * * * *